United States Patent
Toshiro et al.

(10) Patent No.: US 11,223,038 B2
(45) Date of Patent: Jan. 11, 2022

(54) METHOD FOR MANUFACTURING SECONDARY BATTERY

(71) Applicant: VEHICLE ENERGY JAPAN INC., Hitachinaka (JP)

(72) Inventors: Hiroyuki Toshiro, Hitachinaka (JP); Motonari Kifune, Hitachinaka (JP); Yasuo Arishima, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 196 days.

(21) Appl. No.: 16/625,290

(22) PCT Filed: Mar. 8, 2018

(86) PCT No.: PCT/JP2018/008886
§ 371 (c)(1),
(2) Date: Dec. 20, 2019

(87) PCT Pub. No.: WO2019/008827
PCT Pub. Date: Jan. 10, 2019

(65) Prior Publication Data
US 2020/0220157 A1    Jul. 9, 2020

(30) Foreign Application Priority Data

Jul. 3, 2017 (JP) .............................. JP2017-130559

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/366* (2013.01); *H01M 4/628* (2013.01)

(58) Field of Classification Search
None
See application file for complete search history.

(56) References Cited

U.S. PATENT DOCUMENTS

2009/0067119 A1    3/2009   Katayama
2010/0330410 A1   12/2010   Takahashi
(Continued)

FOREIGN PATENT DOCUMENTS

JP        2015-135747 A       7/2015
WO    WO-2007/066768 A1       6/2007
(Continued)

OTHER PUBLICATIONS

International Search Report with English translation and Written Opinion issued in corresponding application No. PCT/JP2018/008886 dated Jun. 12, 2018.

*Primary Examiner* — Tracy M Dove
(74) *Attorney, Agent, or Firm* — Foley & Lardner LLP

(57) ABSTRACT

An object of the present invention is to provide a method for manufacturing a secondary battery with enhanced insulating reliability without degrading the performance of an active material mixture layer formed on an electrode. The present invention provides a method for manufacturing a prismatic secondary battery (100) including a negative electrode (41) having a negative electrode current-collecting foil (411), a negative electrode mixture layer (412) formed thereon, and an insulating layer (413) formed on the negative electrode mixture layer (412). The method of the present invention includes a step of forming the negative electrode mixture layer (412) and the insulating layer (413) by concurrently applying an active material mixture slurry and an insulating layer dispersion liquid to the negative electrode current-collecting foil (411). Each ceramic particle (413a) has a plate shape with an aspect ratio greater than or equal to 2.0 and less than or equal to 5.0. The particle size of each (Continued)

mixture particle (412*a*) is greater than the length of the long side of each ceramic particle (413*a*).

7 Claims, 7 Drawing Sheets

(51) Int. Cl.
*H01M 4/36* (2006.01)
*H01M 4/66* (2006.01)
*H01M 4/62* (2006.01)

(56) References Cited

U.S. PATENT DOCUMENTS

2012/0189897 A1 7/2012 Wakizaka
2013/0266873 A1 10/2013 Ishii

FOREIGN PATENT DOCUMENTS

| WO | WO-2009/081594 A1 | 7/2009 |
| WO | WO-2011/040562 A1 | 4/2011 |
| WO | WO-2012/057324 A1 | 5/2012 |

METHOD FOR MANUFACTURING SECONDARY BATTERY

TECHNICAL FIELD

The present invention relates to a method for manufacturing a secondary battery and, for example, relates to a method for manufacturing a secondary battery for use in a power source for driving an electric vehicle, a hybrid electric vehicle, or the like.

BACKGROUND ART

In recent years, high-capacity (Wh) secondary batteries have been developed as power sources for hybrid electric vehicles, pure electric vehicles, and the like. Among them, nonaqueous solution-based lithium ion secondary batteries with high energy density (Wh/kg) are drawing attention. In addition, there has been an increasing need for electric drive of automobiles from perspectives of suppressing exhaust gas and prioritizing environmental performance, and thus, high-capacity batteries are demanded. Further, batteries used as power sources for driving electric motors are demanded to have large-current output characteristics.

A lithium ion secondary battery basically includes a positive electrode, a negative electrode, and a separator for electrically insulating them. A band-like metal foil of each of the positive electrode and the negative electrode has a surface coated with an active material mixture into/from which lithium ions can be inserted or desorbed, thus forming a mixture layer. Such a positive electrode and a negative electrode are wound in a mutually overlapped state and thus are formed as an electrode group. Then, the electrode group is put into a can or an exterior laminate package and is enclosed therein while being impregnated with an electrolytic solution.

The positive electrode and the negative electrode are insulated with a porous film separator, which is made of polyethylene or polypropylene, interposed therebetween. In recent years, providing an inorganic layer made of ceramic on a surface of a separator or providing a ceramic layer on a surface of an electrode have been proposed to prevent internal short-circuit and enhance heat resistance performance.

CITATION LIST

Patent Literature

Patent Literature 1: JP 2005-285605 A

SUMMARY OF INVENTION

Technical Problem

To secure safety, forming a ceramic layer on a negative electrode mixture layer has been proposed. However, the conventional negative electrode mixture layer and ceramic layer are formed through the sequential steps of applying a slurry-form negative electrode mixture, evaporating the solvent by drying it to form a negative electrode mixture layer, and then forming a ceramic layer on the negative electrode mixture layer. In such a negative electrode mixture layer, gaps are formed between adjacent mixture particles of the negative electrode mixture as the solvent evaporates, and the gaps are continuous in the thickness direction of the negative electrode mixture layer, thus forming ion movement paths.

However, there is a problem in that when a ceramic layer is formed on the negative electrode mixture layer, ceramic particles enter the gaps between the mixture particles of the negative electrode mixture, and thus block the ion movement paths. Patent Literature 1 describes providing an insulating layer on an electrode surface to protect against short-circuit between the electrodes. However, Patent Literature 1 fails to describe gaps that are generated in the electrode mixture layer and the insulating layer during the steps of producing the electrodes.

The present invention has been made in view of the foregoing, and an object of the present invention is to provide a method for manufacturing a secondary battery with enhanced insulating reliability without degrading the performance of an active material mixture layer formed on an electrode, which can efficiently form an insulating layer without blocking ion movement paths.

Solution to Problem

A method for manufacturing a secondary battery according to the present invention is a method for manufacturing a secondary battery including an electrode, the electrode having an electrode foil, an active material mixture layer formed on the electrode foil, and an insulating layer formed on the active material mixture layer, the method including concurrently applying to the electrode foil an active material mixture slurry containing an active material mixture to form the active material mixture layer, and an insulating layer dispersion liquid containing insulating particles to form the insulating layer, thereby forming the active material mixture layer and the insulating layer on the electrode foil, in which each insulating particle has a plate shape, and provided that the thickness of each insulating particle is d and the length of the long side of each insulating particle is a, the aspect ratio a/d of each insulating particle is greater than or equal to 2.0 and less than or equal to 5.0, and the particle size of each of mixture particles forming the active material mixture is greater than the length of the long side of each insulating particle.

Advantageous Effects of Invention

According to the present invention, a method for manufacturing a secondary battery with enhanced output characteristics as electrode performance and enhanced insulating reliability, which can secure ion movement paths for solvated lithium ions contributing to electrode reactions, can be provided.

Further features related to the present invention will become apparent from the following description of the specification and accompanying drawings. In addition, other problems, configurations, and advantageous effects will become apparent from the following description of embodiments.

DESCRIPTION OF EMBODIMENTS

Hereinafter, an embodiment of a secondary battery of the present invention will be described with reference to the drawings.

Embodiment 1

Figure 1:
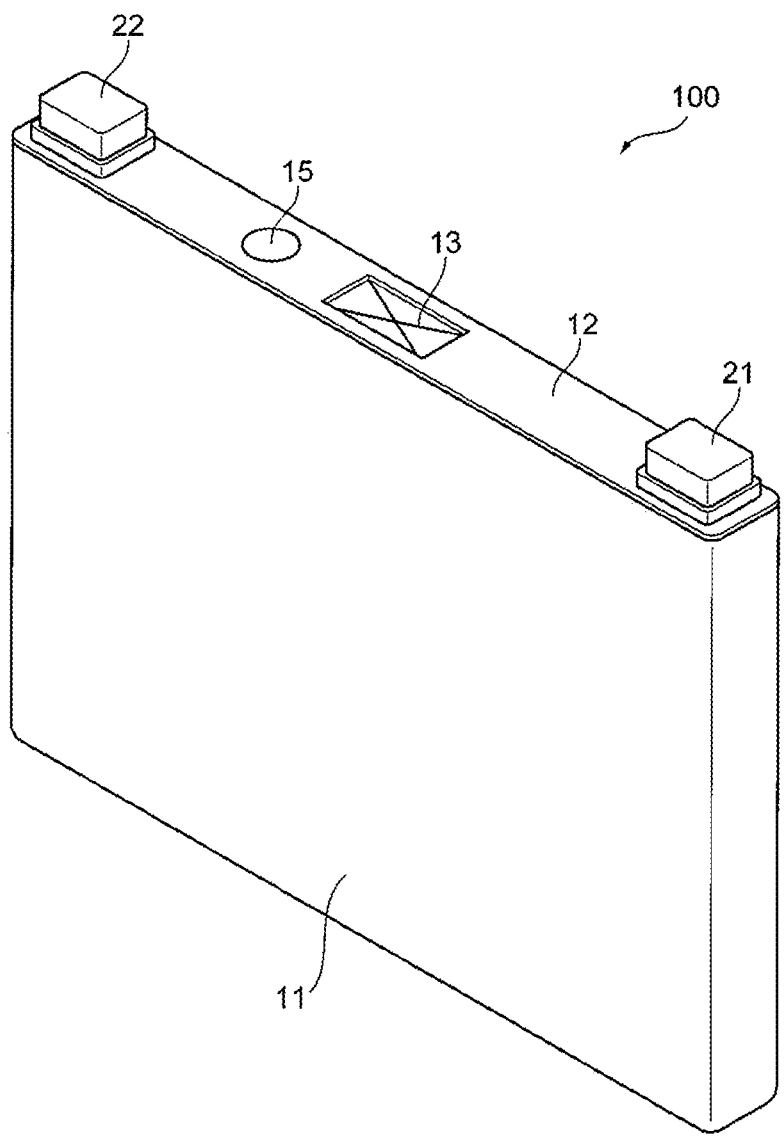
FIG. 1 is a perspective external view of a prismatic secondary battery according to Embodiment 1 of the present invention.

FIG. 1 is a perspective external view of a prismatic secondary battery 100 according to the present embodiment. A battery can 11 includes a pair of wide faces 11b, a pair of narrow faces 11c, and a bottom face 11d. The upper face portion corresponds to an opening 11a for housing an electrode group 40. The upper face portion of the battery can 11 is covered with a battery lid 12. The battery lid 12 includes a negative electrode external terminal 21, a positive electrode external terminal 22, a liquid injection plug 15 for closing a liquid injection port 14, and a gas discharge valve 13.

Figure 2:
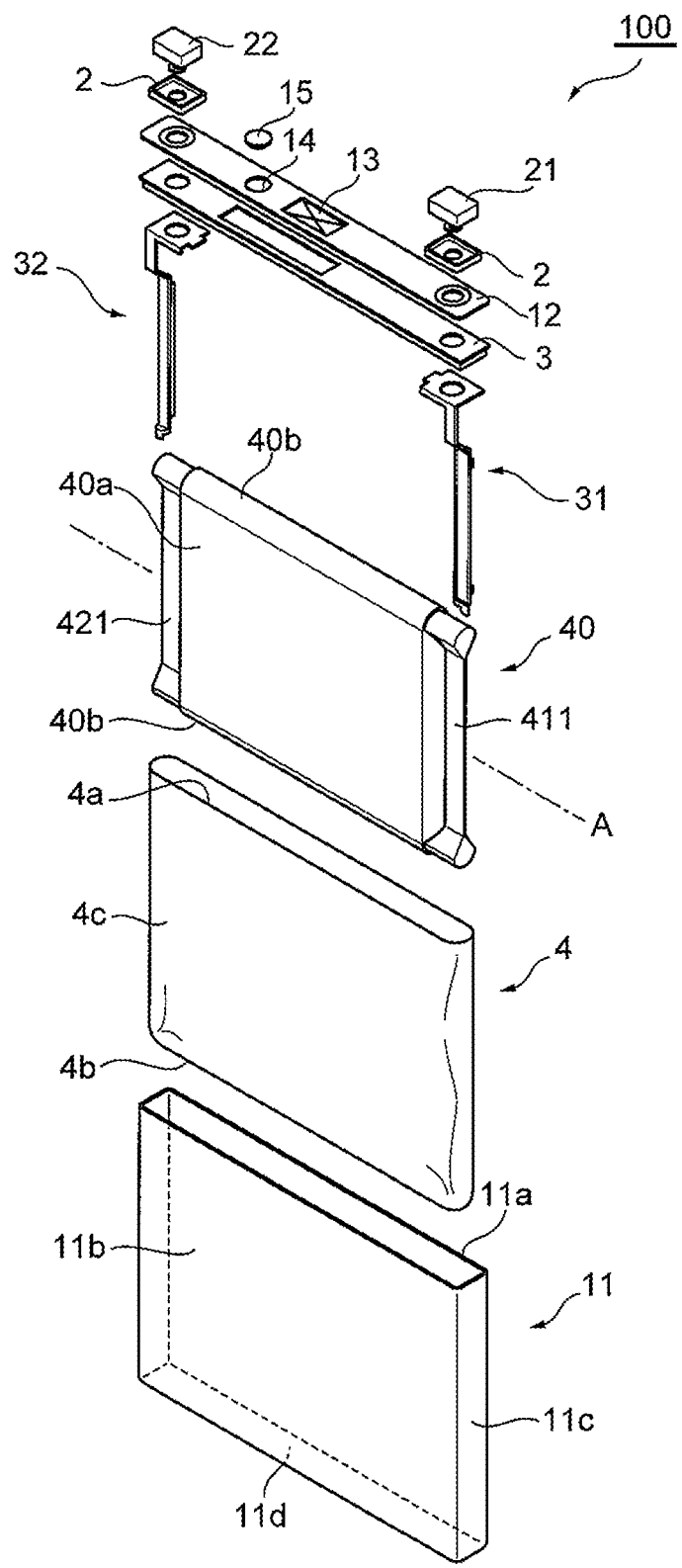
FIG. 2 is an exploded perspective view of the prismatic secondary battery illustrated in FIG. 1.

FIG. 2 is an exploded perspective view of the prismatic secondary battery illustrated in FIG. 1.

The prismatic secondary battery 100 includes the flat electrode group 40 obtained by winding positive and negative electrodes, the battery can 11 with a flat prismatic shape for housing the electrode group 40, the battery lid 12 for sealing the opening 11a of the battery can 11, and an insulating member 3 fixed to the battery lid 12 and housed in the battery can 11.

The negative electrode external terminal 21 is disposed on the battery lid 12 with an insulating member 2 interposed therebetween, and is coupled to a negative electrode current collector 31 inside the battery can 11. The negative electrode current collector 31 is welded to a negative electrode current-collecting foil 411 of the electrode group 40 and thus is coupled thereto. The same is true of the positive electrode external terminal 22, and the positive electrode external terminal 22 is disposed on the battery lid 12 with an insulating member 2 interposed therebetween and is coupled to a positive electrode current collector 32 inside the battery can 11. The positive electrode current collector 32 is welded to a positive electrode current-collecting foil 421 of the electrode group 40 and thus is coupled thereto. The battery lid 12 has integrally fixed thereto the negative electrode external terminal 21, the positive electrode external terminal 22, the negative electrode current collector 31, and the positive electrode current collector 32, and thus is formed as a sub-assembly as a lid assembly.

The electrode group 40 is attached to the lid assembly as the sub-assembly, and is housed in the battery can 11 while being housed in an insulating sheet 4 formed in a bag shape. Such a configuration can prevent short-circuit between the current collector or the electrode group and the battery can 11. It should be noted that the insulating sheet 4 includes a side face portion 4c, a bottom face portion 4b, and an opening 4a.

Figure 3:
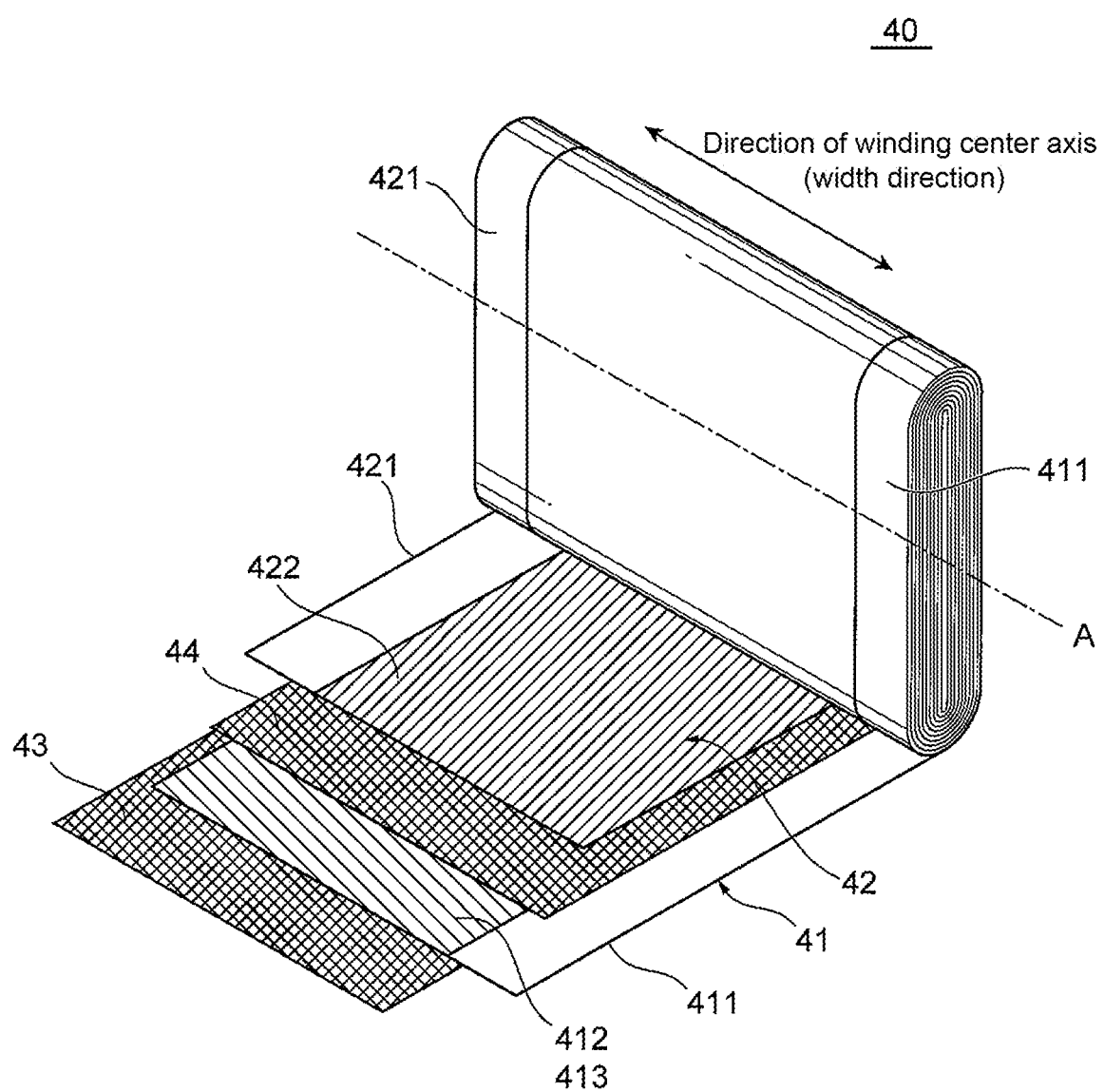
FIG. 3 is an exploded perspective view of a wound electrode group of the prismatic secondary battery illustrated in FIG. 2.

FIG. 3 is an exploded perspective view of the wound structure of a part of the electrode group 40 illustrated in FIG. 2.

A negative electrode 41 having the negative electrode current-collecting foil 411 and a negative electrode mixture layer 412 formed thereon, and a positive electrode 42 having the positive electrode current-collecting foil 421 and a positive electrode mixture layer 422 formed thereon are wounded around an axis A with an opposed arrangement kept therebetween with separators 43 and 44 interposed therebetween so that the electrodes are stacked and the electrode group 40 is formed.

The electrode group 40 includes the negative electrode 41 and the positive electrode 42, which are stacked with the separators 43 and 44 interposed therebetween, wound around the shaft center parallel with the winding axis A and are formed in a flat shape. Each of the separators 43 and 44 is produced from porous polyethylene resin, for example, and insulate the negative electrode 41 and the positive electrode 42. The separators 43 and 44 are also wound around the outer side of the negative electrode 41 on the outermost periphery.

The negative electrode 41 includes the negative electrode mixture layer 412 formed on the surface of the negative electrode current-collecting foil 411, and also includes an insulating layer 413 covering the surface of the negative electrode mixture layer 412, though not explicitly illustrated in FIG. 3. In addition, the positive electrode 42 includes the positive electrode mixture layer 422 formed on the surface of the current-collecting foil 421.

Figure 4:
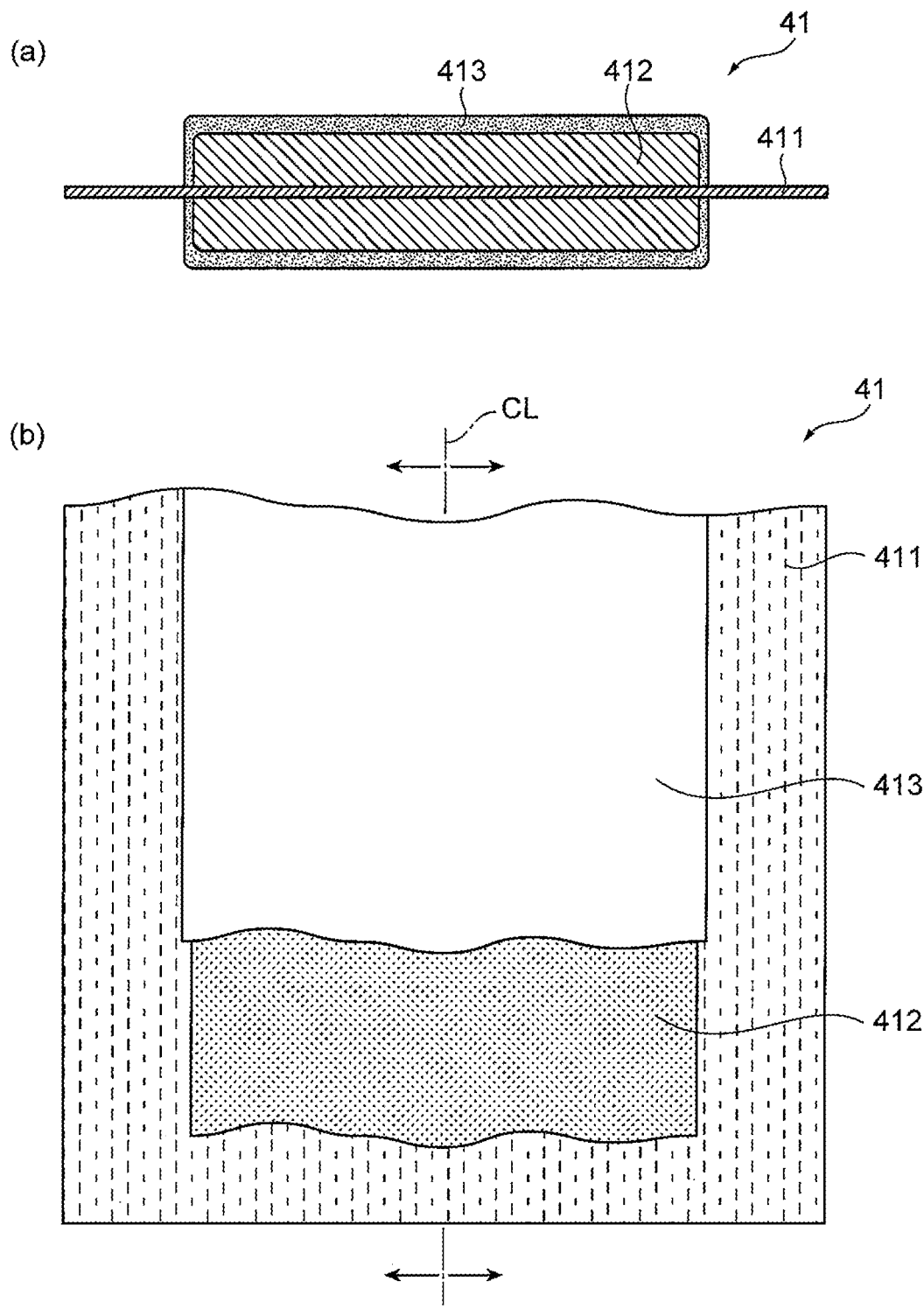
FIG. 4 is a schematic view of a cross-section of the electrode according to Embodiment 1 and an external view of the electrode surface.

FIG. 4 is a schematic view illustrating the configuration of the negative electrode 41 before it is cut. Specifically, FIG. 4(a) is a cross-sectional view and FIG. 4(b) is a plan view.

As illustrated in FIG. 4(a), the negative electrode 41 includes the negative electrode mixture layer 412 formed on opposite sides of the negative electrode current-collecting foil 411, and further includes the insulating layer 413 covering each surface of the negative electrode mixture layer 412.

In the plan view of FIG. 4(b), a portion not covered with the insulating layer 413 is shown to illustrate the negative electrode mixture layer 412. However, actually, the entire surface of a portion provided with the negative electrode mixture layer 412 is covered with the insulating layer 413. The negative electrode 41 illustrated in FIG. 4(b) is in a state before it is cut, and is thereafter cut into two pieces on the right and left sides across the center CL along the width direction, and thus two negative electrodes 41 result.

Figure 5:
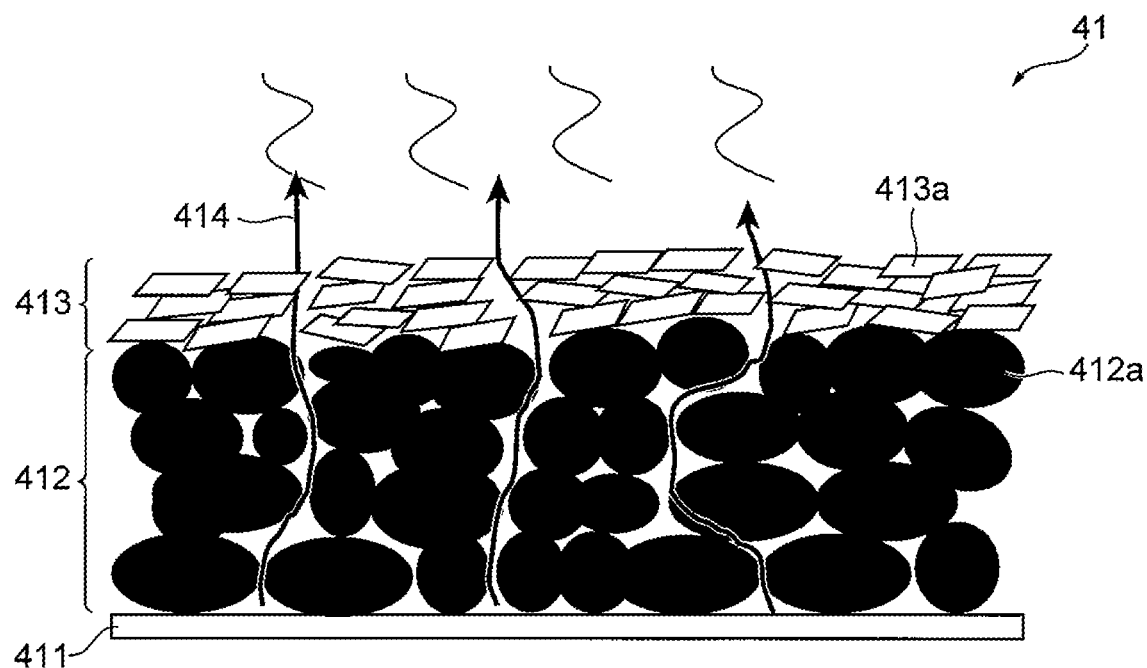
FIG. 5 is an enlarged schematic view of a cross-section of the electrode.

FIG. 5 is an enlarged schematic view of a cross-section of the negative electrode. FIG. 5 illustrates the configuration of only one side of the negative electrode and the configuration of the other side is omitted.

As illustrated in FIG. 5, the negative electrode 41 includes the negative electrode mixture layer 412 formed on the negative electrode current-collecting foil (i.e., electrode foil) 411, and the insulating layer 413 formed on the negative electrode mixture layer. The negative electrode mixture layer 412 contains negative electrode mixture particles 412a, and the insulating layer 413 contains ceramic particles 413a.

The negative electrode mixture layer 412 and the insulating layer 413 are formed by concurrently applying a negative electrode mixture slurry and an insulating layer dispersion liquid to the negative electrode current-collecting foil 411. Herein, the phrase "to concurrently apply" means a case where a negative electrode mixture slurry and an insulating layer dispersion liquid are stacked in layers in advance and are applied in the stacked state to the negative electrode current-collecting foil 411, and also includes a case where a negative electrode mixture slurry is applied to the negative electrode current-collecting foil 411 in advance, and an insulating layer dispersion liquid is applied to the negative electrode mixture slurry in a wet state before the surface of the negative electrode mixture slurry dries.

The negative electrode mixture slurry (i.e., active material mixture slurry) contains a negative electrode active material mixture and a solvent, while the insulating layer dispersion liquid contains insulating particles and a solvent. The negative electrode mixture slurry is produced by adding an carboxymethylcellulose (CMC) aqueous solution as a thickening adjuster to 100 parts by weight of graphite carbon powder as a negative electrode active material, for example, and mixing them and adding 1 part by weight of SBR as a binder to the mixture, and further kneading them and adjusting the viscosity of the mixture. The insulating layer dispersion liquid is produced by selecting boehmite for the ceramic particles 413a and dispersing them in a solvent containing one or both of a resin-based binder or a rubber-based binder.

The negative electrode mixture slurry and the insulating layer dispersion liquid are concurrently applied to the negative electrode current-collecting foil 411 and are thereafter dried concurrently. Therefore, in the negative electrode mixture layer 412 and the insulating layer 413, voids are formed between adjacent mixture particles of the negative electrode mixture and between adjacent insulating particles as the solvents evaporate, and the voids are continuous in the thickness direction of the negative electrode mixture layer 412 and the insulating layer 413, thus forming ion movement paths 414. In the present embodiment, each of the gaps between the mixture particles of the negative electrode mixture is greater than 0 μm and less than 5 μm.

Figure 6:
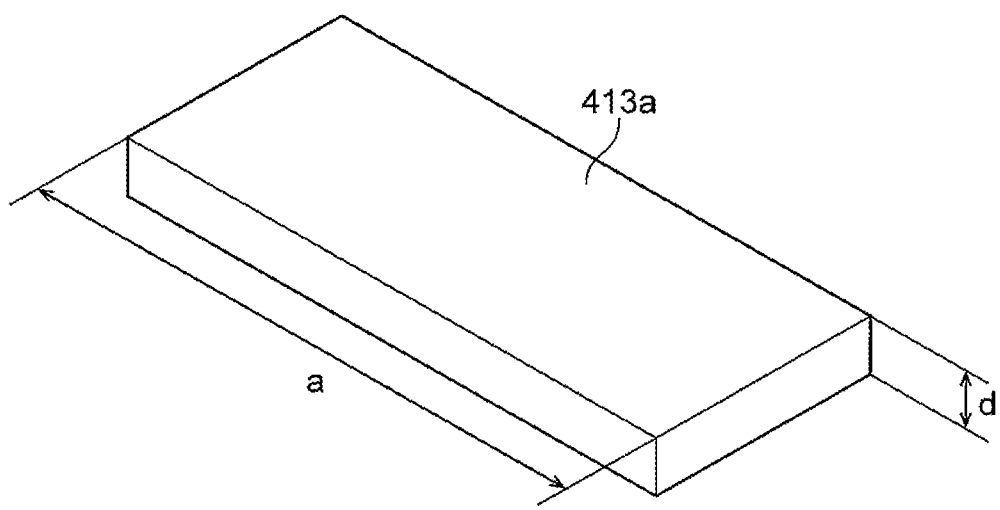
FIG. 6 is a schematic view of the shape of a ceramic particle according to Embodiment 1.

FIG. 6 is a schematic view of the shape of a ceramic particle according to Embodiment 1.

The insulating layer 413 contains the ceramic particles 413a as the insulating particles. Each ceramic particle 413a has a plate shape as illustrated in FIG. 6. Provided that the thickness is d and the length of the long side is a, the aspect ratio=a/d is preferably greater than or equal to 2.0 and less than or equal to 5.0, and further preferably, a plate-shaped particle with an aspect ratio greater than or equal to 3.0 and less than or equal to 4.0 is selectively used. Each ceramic particle 413a has the long side with the length a that is less than or equal to the particle size of each mixture particle 412a of the negative electrode mixture. That is, the particle size of each mixture particle 412a forming the negative electrode mixture is greater than the length a of the long side of each insulating particle. In the present embodiment, the length a of the long side of each ceramic particle 413a is greater than or equal to 5 μm.

To form the insulating layer 413, porous inorganic particles are preferably used for the constituent insulating particles, and to provide the insulating layer 413 with a thinner thickness and excellent coverage, plate-shaped particles with angular rhomboidal faces are more preferably used.

Figure 7:
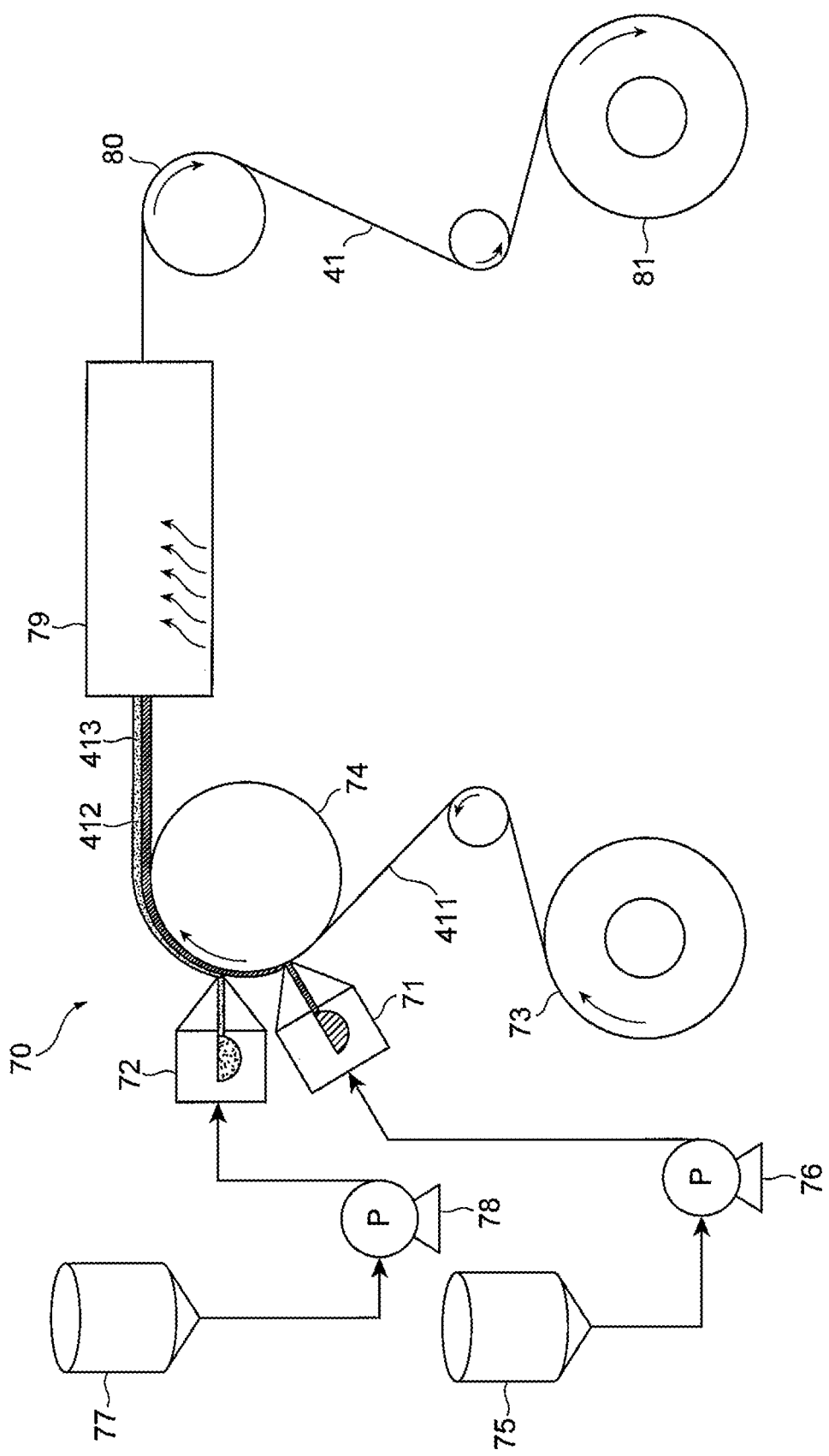
FIG. 7 is a schematic view of an exemplary coater.

FIG. 7 is a schematic view of an exemplary coater.

The coater 70 includes a current-collecting foil roll 73 having the negative electrode current-collecting foil 411 wound thereon, a backup roll 74 for winding up the negative electrode current-collecting foil 411 drawn out of the current-collecting foil roll 73, a die 71 for applying a negative electrode mixture slurry to the negative electrode current-collecting foil 411 wound up on the backup roll 74, and a die 72 for applying an insulating layer dispersion liquid to the negative electrode mixture slurry.

In addition, the coater 70 includes a dryer 79 for drying the negative electrode mixture slurry and the insulating layer dispersion liquid applied to the negative electrode current-collecting foil 411, a roll 80 for taking out the negative electrode 41, which has been formed through drying, from the dryer 79, and a wind-up roller 81 for winding up the negative electrode 41 taken out from the roll 80.

The die 71 is coupled to a tank 75 storing the negative electrode mixture slurry via a feed pump 76, and the die 72 is coupled to a tank 77 storing the insulating layer dispersion liquid via a feed pump 78. The negative electrode mixture slurry is fed from the die 71, and the insulating layer dispersion liquid is fed from the die 72. Then, the negative electrode mixture slurry and the insulating layer dispersion liquid are applied to one of the surfaces of the negative electrode current-collecting foil 411 conveyed from the current-collecting foil roll 73 and arranged on the backup roll 74, as a surface to be coated.

The dies 71 and 72 are arranged at positions away from each other by a predetermined distance in the direction in which the negative electrode current-collecting foil 411 is conveyed. In the present embodiment, the dies 71 and 72 are arranged at positions opposite the backup roll 74 and at positions away from each other by a predetermined distance on the front side and the rear side of the backup roll 74 in the direction of rotation.

The die 71 applies the negative electrode mixture slurry to the negative electrode current-collecting foil 411, and the die 72 applies the insulating layer dispersion liquid to the negative electrode mixture slurry in a wet state before the surface of the negative electrode mixture slurry dries. The time until which the surface of the negative electrode mixture layer 412 dries is determined in advance, and its wet state lasts for 30 seconds after the slurry is applied, for example. The die 72 is arranged at a position where the insulating layer dispersion liquid can be applied before 30 seconds have elapsed after the application of the slurry.

The coater 70 of the present embodiment is configured such that the negative electrode mixture slurry enters the dryer 79 while the surface of the negative electrode mixture slurry is kept wet. Therefore, it is acceptable as long as the die 72 is arranged between the die 71 and the dryer 79.

The negative electrode mixture slurry is fed from the tank 75 to the die 71 while being controlled by the feed pump 76 to have an appropriate thickness. Meanwhile, the insulating layer dispersion liquid is fed from the tank 77 to the die 72 while being controlled by the feed pump 78 to have an appropriate thickness. The viscosity of the insulating layer dispersion liquid is set lower than that of the negative electrode mixture slurry so that the insulating layer dispersion liquid spreads promptly and smoothly when applied to the negative electrode mixture layer 412, thus uniformly covering the entire surface of the negative electrode mixture layer 412.

The negative electrode mixture layer 412 and the insulating layer 413 in the liquid state are conveyed into the dryer 79 while being applied to the negative electrode current-collecting foil 411, and are provided with an appropriate temperature and dry air while being conveyed through the dryer 79 so that the solvent components evaporate and dry at the same time. Therefore, gaps are formed between adjacent negative electrode mixture particles and adjacent insulating particles, forming void structures that are continuous from the negative electrode current-collecting foil 411 to the surface of the insulating layer 413. Thus, the ion movement paths 414 are formed.

The negative electrode 41 having the dried negative electrode mixture layer 412 and insulating layer 413 is wound up in the dried state by the roller 81. Then, a negative electrode mixture slurry and an insulating layer dispersion liquid are also applied to the other surface of the current-collecting foil through a similar process, so that the negative electrode mixture layer 412 and the insulating layer 413 are formed.

Although the coater 70 illustrated in FIG. 7 has a configuration in which the die 71 and the die 72 are positioned away from each other, the configuration of the coater 70 is not limited thereto, and it is acceptable as long as the insulating layer dispersion liquid can be applied to the negative electrode mixture slurry while the surface of the negative electrode mixture slurry is in a wet state before it dries. For example, the coater 70 may have a configuration in which the negative electrode mixture slurry and the insulating layer dispersion liquid that have been stacked in layers in advance are discharged from a single die, and they are concurrently applied in the stacked state to the negative electrode current-collecting foil 411.

Figure 8:
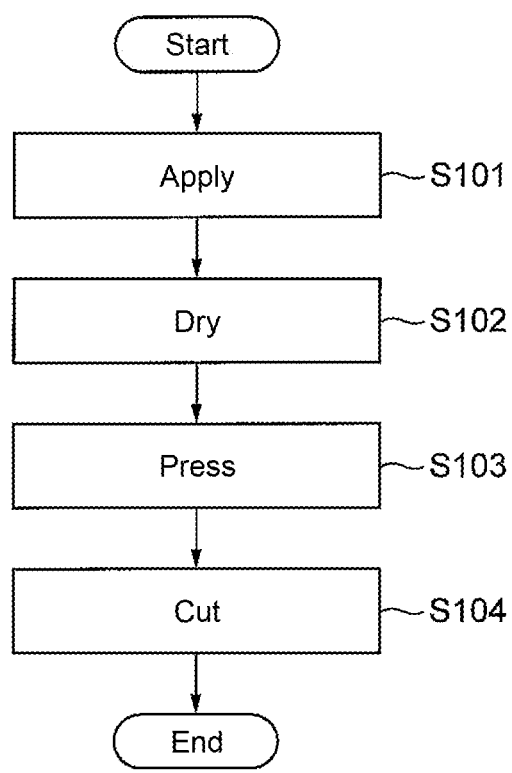
FIG. 8 is a flowchart illustrating the steps of producing a negative electrode of a secondary battery.

FIG. 8 is a flowchart illustrating the steps of producing the negative electrode.

The method of producing the negative electrode 41 includes an application step (step S101) of concurrently applying a negative electrode mixture slurry and an insulating layer dispersion liquid to the negative electrode current-collecting foil 411, a drying step (step S102) of concurrently drying the negative electrode mixture slurry applied to the negative electrode current-collecting foil 411 and the insulating layer dispersion liquid applied to the negative electrode mixture slurry, a pressing step (step S103) of pressing them between a pair of roll presses after drying them, and a cutting step (step S104) of cutting them into an appropriate size.

Next, an example of a specific method for manufacturing the prismatic secondary battery will be described.

The negative electrode can be produced as follows, for example. First, a negative electrode mixture slurry is produced by adding an carboxymethylcellulose (CMC) aqueous solution as a thickening adjuster to 100 parts by weight of graphite carbon powder as a negative electrode active material, for example, and mixing them and adding 1 part by weight of SBR as a binder to the mixture, and further kneading them and adjusting the viscosity of the mixture. Next, the negative electrode mixture slurry is applied to opposite surfaces of a copper foil (i.e., a negative electrode current-collecting foil) with a thickness of 8 μm, for example, while leaving an exposed portion of the foil, thereby forming the negative electrode mixture layer 412.

Then, an insulating layer dispersion liquid produced separately is applied to the liquid-state surface of the negative electrode mixture layer 412, thus forming the insulating layer 413. Accordingly, the negative electrode mixture layer 412 and the insulating layer 413 are applied in the wet state. After that, drying, pressing, and cutting steps are performed so that a negative electrode with two layers including the negative electrode mixture layer 412 and the insulating layer 413 can be produced. For example, the negative electrode 41 can be obtained in which the thickness (i.e., the total thickness of the front and rear faces) of the negative electrode active material applied portion (i.e., the negative electrode mixture layer+the insulating layer) excluding the copper foil is 74 μm.

The positive electrode mixture layer 422 can be produced as follows, for example. First, a total of 7 parts by weight of scale-like graphite and acetylene black as an electrical conducting material, and 3 parts by weight of polyvinylidene fluoride (hereinafter referred to as "PVDF") as a binder are added to 100 parts by weight of layered lithium nickel cobalt manganite (chemical formula: $Li(Ni_xCo_y Mn_{1-x-y})O_2$) as a positive electrode active material and then, a N-methylpyrrolidone (hereinafter referred to as "NMP") is applied thereto as a dispersing solvent, and the mixture is kneaded to produce a positive electrode mixture slurry. Next, the positive electrode mixture slurry is applied to opposite surfaces of an aluminum foil with a thickness of 15 μm, for example, while leaving an exposed portion of the foil, thus forming the positive electrode mixture layer 422. After that, drying, pressing, and cutting steps are performed so that the positive electrode 42 can be obtained in which the thickness (i.e., the total thickness of the front and rear faces) of the positive electrode active material applied portion excluding the aluminum foil is 70 μm. It should be noted that an insulating layer may also be formed on the front surface of the positive electrode mixture layer 422 as with the negative electrode 41.

Then, the positive electrode 42 and the negative electrode 41 are wound in an overlapped manner with the separators 43 and 44 interposed therebetween to produce the wound electrode group 40. Specifically, the tip ends of the separators 43 and 44 are welded to the shaft center (not illustrated), and the separators 43 and 44, the positive electrode 42, and the negative electrode 41 are wound while being alternately stacked. At this time, the winding start end of the positive electrode 42 is set closer to the shaft center than is the winding start end of the negative electrode 41 so that the winding start end of the positive electrode 42 is located on the inner side of the wound electrode group 40 than is the winding start end of the negative electrode 41.

As illustrated in FIG. 2, the wound electrode group 40 is housed in the insulating sheet 4 in the bag shape, and the battery lid 12 is joined to the battery can 11. Then, the battery lid 12 is welded to the upper opening of the battery can 11 for sealing purposes, and a nonaqueous electrolytic solution is injected into the battery can 11 through the liquid injection port 14 and then, the liquid injection plug 15 is welded to the liquid injection port 14 for sealing purposes so that the prismatic secondary battery 100 is produced. The nonaqueous electrolytic solution injected through the liquid injection port 14 infiltrates the wound electrode group 40 housed in the battery can 11. Examples of the nonaqueous electrolytic solution that can be used include a solution obtained by dissolving lithium hexafluorophosphate ($LiPF_6$) in a mixed solution, which has been obtained by mixing ethylene carbonate and dimethyl carbonate at a volume ratio of 1:2, at a concentration of 1 mol/little.

The method for manufacturing the secondary battery of the present embodiment includes the steps of forming the negative electrode mixture layer 412 on the negative electrode current-collecting foil 411 by concurrently forming the negative electrode mixture slurry and the insulating layer dispersion liquid on the negative electrode current-collecting foil 411, and forming the insulating layer 413 on the negative electrode mixture layer 412. In addition, each ceramic particle 413a has a plate shape with an aspect ratio a/d greater than or equal to 2.0 and less than or equal to 5.0, and the particle size of each mixture particle 412a forming the negative electrode mixture is greater than the length of the long side of each ceramic particle 413a.

Conventionally, ceramic particles are applied to a negative electrode mixture layer after the negative electrode mixture layer is formed and dried. Thus, the ceramic particles may likely enter gaps between mixture particles of the negative electrode mixture layer, and the ceramic particles having entered the negative electrode mixture layer may block the ion movement paths.

According to the present embodiment, a negative electrode mixture slurry and an insulating layer dispersion liquid are concurrently applied to the negative electrode current-collecting foil 411 to form the active material mixture layer 412 and the insulating layer 413. In this manner, applying an insulating layer dispersion liquid to a negative electrode mixture slurry in a liquid state can allow the insulating layer 413 to emerge on the surface of the negative electrode mixture layer 412. In addition, since the negative electrode mixture slurry and the insulating layer dispersion liquid can be dried concurrently, gaps can be formed between adjacent mixture particles of the negative electrode mixture in the negative electrode mixture layer 412 and between adjacent insulating particles in the insulating layer 413 as the solvents evaporate. Such gaps can form the ion movement paths 414 that are continuous in the thickness direction of the negative electrode mixture layer 412 and the insulating layer 413. Therefore, ion movement paths for lithium ions contributing to electrode reactions can be secured.

In addition, each ceramic particle 413a has a plate shape with an aspect ratio a/d greater than or equal to 2.0 and less than or equal to 5.0, and the particle size of each mixture particle 412a of the negative electrode mixture is greater than the length of the long side of each ceramic particle 413a. Therefore, it is possible to suppress intrusion of the ceramic particles 413a into the gaps between the mixture particles 412a of the negative electrode mixture, and thus secure the ion movement paths 414.

In addition, in the present embodiment, the length of the long side of each ceramic particle 413a is greater than or equal to 5 μm, and the gap between the adjacent mixture particles 412a of the negative electrode mixture in the negative electrode mixture layer 412 is greater than 0 μm and less than 5 μm. Therefore, it is possible to reliably suppress intrusion of the ceramic particles 413a into the gaps between the mixture particles 412a of the negative electrode mixture. Such a structure can produce an electrode structure with a greater number of continuous void structures in the mixture layer and in the insulating layer as compared to those of the conventional structure. Therefore, the resistance of the negative electrode becomes lower, that is, the output improves. In addition, the secondary battery manufactured with the manufacturing method of the present embodiment can secure the advantageous effects of an insulating layer with a thinner thickness than those of the conventional secondary batteries, and thus can enhance insulating reliability.

Conventionally, to reduce the thickness of each of a negative electrode mixture layer and an insulating layer, such layers are formed through the sequential steps of pressing the negative electrode mixture layer after drying it, and then applying an insulating layer to the pressed negative electrode mixture layer. Therefore, the interface between the conventional negative electrode mixture layer and insulating layer is a smooth plane. Meanwhile, in the present invention, the negative electrode mixture layer and the insulating layer are concurrently formed by concurrently applying a negative electrode mixture slurry and an insulating layer dispersion liquid. Therefore, the interface between the negative electrode mixture layer and the insulating layer of the present invention has more irregularities as compared to that of the conventional secondary battery. Thus, observing the interface can know whether the method of forming the negative electrode mixture layer and the insulating layer is the conventional sequentially formation or the concurrent formation of the present invention.

Although the embodiments of the present invention have been described in detail above, the present invention is not limited thereto and various design changes can be made within the spirit and scope of the present invention recited in the appended claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

11 Battery can
12 Battery lid
14 Liquid injection port
15 Liquid injection plug
21 Negative electrode external terminal
22 Positive electrode external terminal
31 Negative electrode current collector
32 Positive electrode current collector
40 Wound electrode group
41 Negative electrode
411 Negative electrode current-collecting foil
412 Negative electrode mixture layer
413 Insulating layer
42 Positive electrode
421 Positive electrode current-collecting foil
422 Positive electrode mixture layer
43, 44 Separator
70 Coater
71, 72 Die
100 Prismatic secondary battery

The invention claimed is:

1. A method for manufacturing a secondary battery including an electrode, the electrode having an electrode foil, an active material mixture layer formed on the electrode foil, and an insulating layer formed on the active material mixture layer, comprising:
concurrently applying to the electrode foil an active material mixture slurry containing an active material mixture to form the active material mixture layer, and an insulating layer dispersion liquid containing insulating particles to form the insulating layer, thereby forming the active material mixture layer and the insulating layer on the electrode foil,
wherein:
each insulating particle has a plate shape, and provided that a thickness of each insulating particle is d and a length of a long side of each insulating particle is a, an aspect ratio a/d of each insulating particle is greater than or equal to 2.0 and less than or equal to 5.0, and
a particle size of each of mixture particles forming the active material mixture is greater than the length of the long side of each insulating particle.

2. The method for manufacturing the secondary battery according to claim 1, wherein the insulating particles are ceramic particles.

3. The method for manufacturing the secondary battery according to claim 2, wherein the ceramic particles contain boehmite.

4. The method for manufacturing the secondary battery according to claim 2, wherein the length of the long side of each ceramic particle is greater than or equal to 5 µm.

5. The method for manufacturing the secondary battery according to claim 2, wherein the aspect ratio a/d of each ceramic particle is greater than or equal to 3.0 and less than or equal to 4.0.

6. The method for manufacturing the secondary battery according to claim 1, wherein a gap between adjacent mixture particles in the active material mixture layer is greater than 0 µm and less than 5 µm.

7. A secondary battery comprising an electrode, the electrode including an electrode foil, and an active material mixture layer and an insulating layer formed on the electrode foil, the active material mixture layer and the insulating layer having been formed by concurrently applying an active material mixture slurry containing an active material mixture and an insulating layer dispersion liquid containing insulating particles to the electrode foil,
wherein:
each insulating particle has a plate shape, and provided that a thickness of each insulating particle is d and a length of a long side of each insulating particle is a, an aspect ratio a/d of each insulating particle is greater than or equal to 2.0 and less than or equal to 5.0, and
a particle size of each of mixture particles forming the active material mixture is greater than the length of the long side of each insulating particle.

* * * * *